United States Patent [19]

Le Jeune

[11] Patent Number: 4,650,546

[45] Date of Patent: Mar. 17, 1987

[54] METHOD FOR THE TREATMENT OF MOIST PRODUCTS

[76] Inventor: Gwénolé J. Le Jeune, Rue du Vignoble, 44450 St Julien de Concelles, France

[21] Appl. No.: 355,558

[22] PCT Filed: Jun. 17, 1981

[86] PCT No.: PCT/FR81/00076

§ 371 Date: Feb. 12, 1982

§ 102(e) Date: Feb. 12, 1982

[87] PCT Pub. No.: WO81/03629

PCT Pub. Date: Dec. 24, 1981

[30] Foreign Application Priority Data

Jun. 17, 1980 [FR] France ................. 80 13407

[51] Int. Cl.⁴ .............................................. C10B 49/04
[52] U.S. Cl. .......................................... 201/6; 48/209;
110/223; 110/230; 201/15; 201/16; 201/25;
201/27; 201/32; 201/34
[58] Field of Search ............ 201/6, 15, 16, 25, 27,
201/32, 34; 48/209; 110/223, 230, 290, 109

[56] References Cited

U.S. PATENT DOCUMENTS

| | | |
|---|---|---|
| 1,639,417 | 8/1927 | Wallace ................. 201/32 |
| 1,740,610 | 12/1929 | Lenk . | |
| 3,027,854 | 4/1962 | Akerlund . | |
| 3,303,946 | 2/1967 | Wilkins ................. 110/109 |
| 3,362,887 | 1/1968 | Rodgers ................. 201/32 |
| 3,938,451 | 2/1976 | Lucas ................. 110/109 |
| 3,956,076 | 5/1976 | Powell et al. ................. 201/25 |
| 4,042,345 | 8/1977 | Anderson ................. 48/209 |
| 4,123,332 | 10/1978 | Rotter ................. 201/15 |
| 4,133,259 | 1/1979 | Pelton ................. 110/109 |
| 4,217,175 | 8/1980 | Reilly ................. 110/109 |

FOREIGN PATENT DOCUMENTS

| | | |
|---|---|---|
| 1502151 | 5/1969 | Fed. Rep. of Germany . |
| 2235255 | 12/1972 | Fed. Rep. of Germany . |
| 323293 | 7/1902 | France . |
| 544993 | 10/1922 | France . |
| 1600245 | 10/1970 | France . |
| 2098378 | 3/1972 | France . |
| 2104443 | 4/1972 | France . |
| 2134494 | 12/1972 | France . |
| 2350550 | 12/1977 | France . |
| 2401978 | 3/1979 | France . |
| 0066612 | 6/1981 | Japan ................. 110/223 |

*Primary Examiner*—Peter Kratz
*Attorney, Agent, or Firm*—Sughrue, Mion, Zinn, Macpeak, and Seas

[57] ABSTRACT

Slugs (4) of products dehydrated by compression are thrust into the tube (11) up to the hearth (15). The hot gases from the hearth passing round the tube (11) heat it up in order to release the gases and carbonize the solids which burn in the form of coke in the bottom (16) of the hearth. Household refuse may thus be eliminated not only without expense but with recovery of energy from it.

6 Claims, 6 Drawing Figures

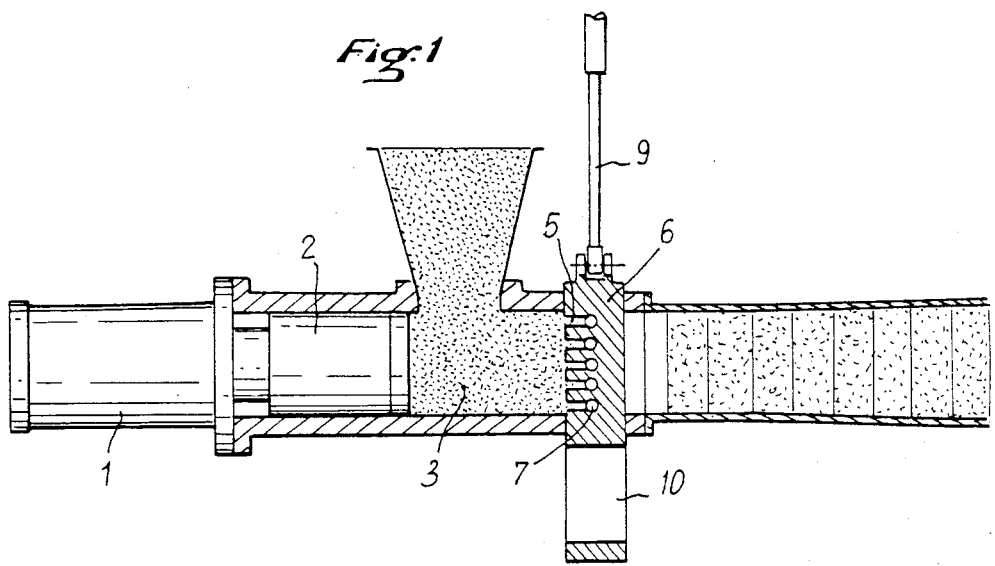
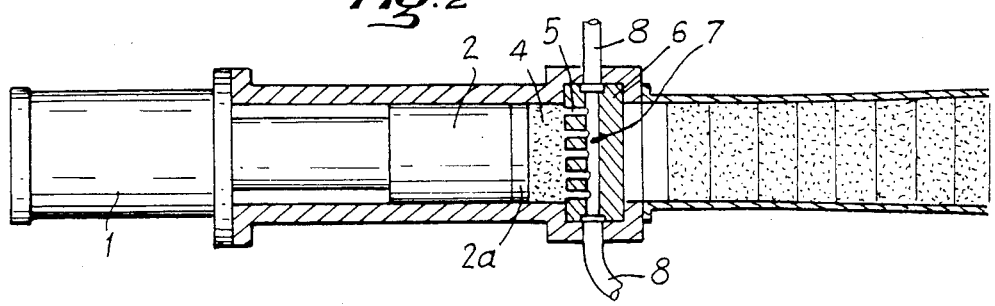
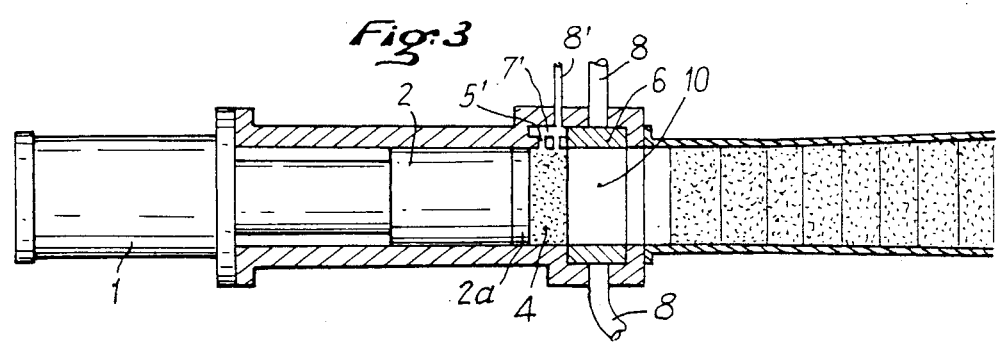
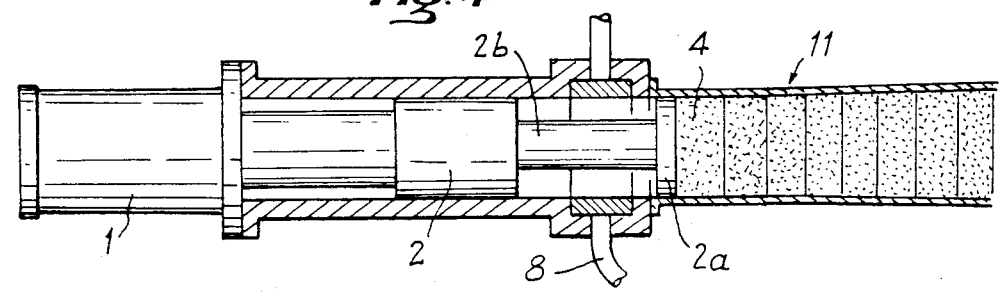

METHOD FOR THE TREATMENT OF MOIST PRODUCTS

The object of the present invention is a method and a device for the treatment of moist products in order to extract from them components of value and/or energy. The invention is applicable in particular to household refuse and other town residues, but it may also be applied to products which are neither waste nor residues but moist raw materials such, for example, as peat, vegetable matter, straw, hay, etc. Of course if in the text below reference is made first of all to household refuse, this is because the invention in this case confers a particularly important advantage, but it is in no case limited to this application.

The accumulation of waste of every kind, especially of household refuse, poses a problem because it must be made to disappear at minimum expense. One of the difficulties is the large content of moisture in refuse, about one third on the average, for example, for household refuse.

The known plants for the treatment of household refuse proceed generally either by combustion or pyrolysis of the raw waste, or by manufacture of a compost intended for agriculture and obtained by various sortings, grindings, and screenings of like raw waste. In any case the expense is considerable.

In accordance with the present invention, waste or the like having a high content of moisture is treated as follows:

the waste is compressed in order to dehydrate it;

the dehydrated waste is heated up to a temperature lying between 350° and 1200° C. in order to release combustible gases from it and make coke from it;

a portion of the products obtained is burned for the heating of the dehydrated waste.

The compression is carried out at a very high pressure, several hundred bars. The moist products are thus freed of water economically and rapidly and the cakes resulting from the compression form a combustible product of sufficient quality for achieving the pyrolysis whilst leaving a positive heat balance which enables supplementary utilization such as the heating of a greenhouse or the combustion in a cement factory, which implies a nearby location of the plant for treatment of the moist products.

In general the calorific value of raw refuse is 1500 to 1800 Kcal/kg and about one third of its mass is water. After dehydration by compression, the calorific value of this dry product becomes a value of the order of 2000 to 3000 Kcal/kg, which enables it to be considered as a real fuel, whereas that is impossible with the raw refuse.

A device for implementing the method in accordance with the invention advantageously includes:

a press having a substantially horizontal cylindrical compression chamber with a piston for compression at one side and a movable wall at the other side, means being provided for making the piston carry out a complementary stroke after removal of the movable wall, in order to move the compressed products beyond the movable wall, orifices being provided in the chamber for letting the fluid products run out during the compression;

a hearth for receiving in the upper portion of it the slugs compressed in the press, and including in the lower portion of it means of discharge of the cinders and of the coke;

between the press and the hearth, a member for transfer and heating of the products compressed in the press, this member comprising: a tubular duct joining the press to the hearth in order to form a guide duct for the slugs formed in the press from the press up to the hearth, at least one portion of the duct at the end located next the press being aligned with the latter; and a tubular sheath surrounding the tubular duct from a first location lying between the press and the hearth up to the hearth itself, for the flow of the gases of combustion and the heating of the slugs advancing in the tubular duct.

The horizontal arrangement of the axis of the jack of the press is very much to be preferred. It would be possible to slope the axis but this would not be advantageous. The tubular guide duct may be straight, curved or angled. The final portion (close to the hearth) is heated by the gases of combustion.

With respect to the raw refuse, one finds in the tubular duct at the outlet from the press a material which is dry and freed of the greater part of the organic matter of low calorific value and above all a great cause of pollution upon combustion.

The description which is to follow in connection with the attached drawings, given by way of non-restrictive example, will let it be well understood how the invention may be carried out.

FIG. 1 to 4 are diagrammatic sections, FIG. 1 through a vertical plane, the others through a horizontal plane, of an embodiment of the compression portion of a device in accordance with the invention;

Figure 5:
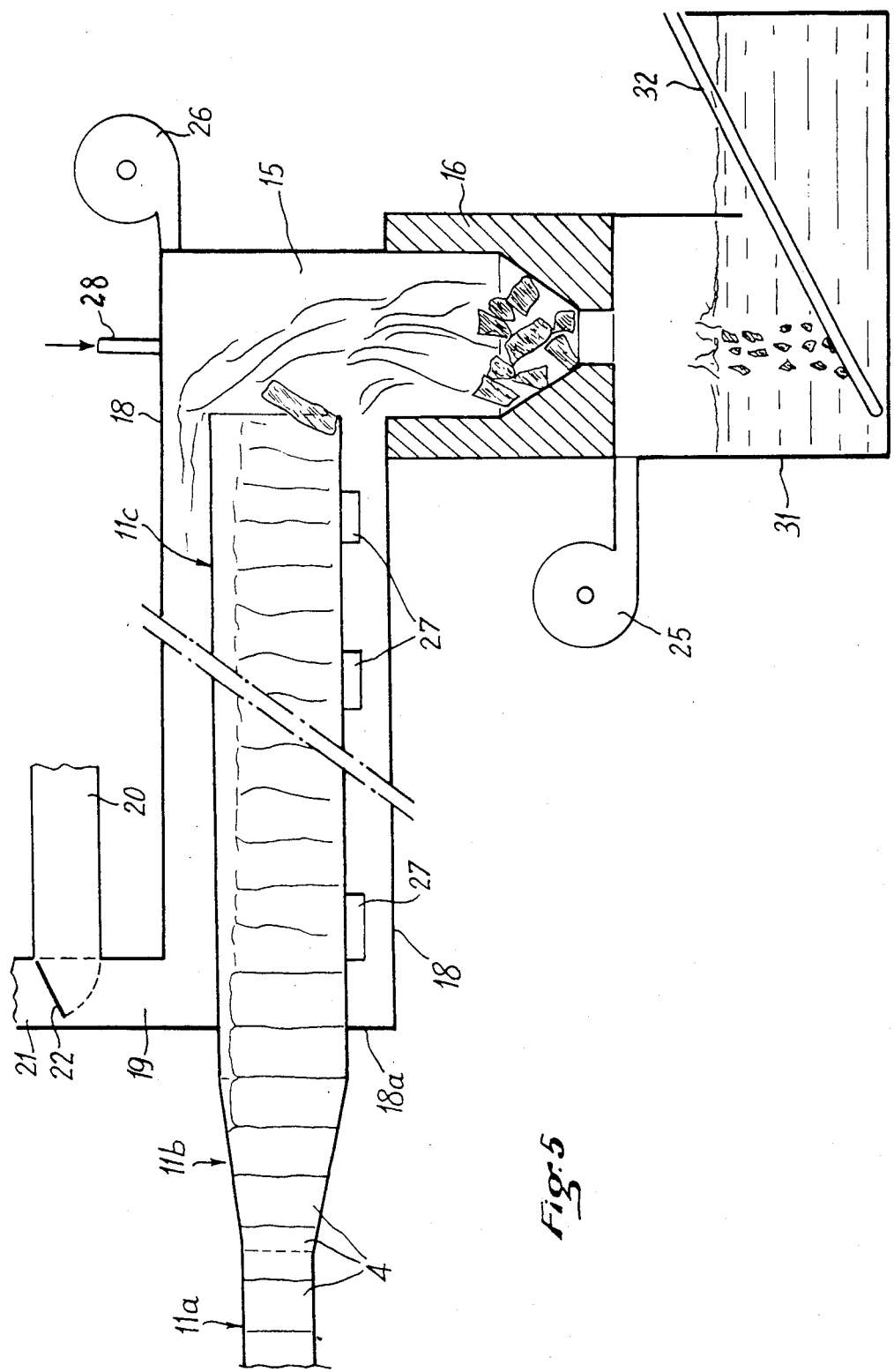
FIG. 5 is a diagrammatic longitudinal section of an embodiment of a device in accordance with the invention.

A device for implementing the method of the invention comprises as a whole three main portions: a compression plant, a tubular furnace for pyrolysis and a hearth. The pyrolysis furnace consists of a tubular duct in which the products advance. This duct may be entirely horizontal or it may include a vertical portion.

The compression plant drives the water out of the moist product mechanically, which in an economic fashion gives a product having a calorific value sufficient for recovering energy. One example of the compression plant is shown diagrammatically in FIGS. 1 to 4. Of course any plant may be employed which enables water to be driven out sufficiently and a dense and graded dry residue to be formed, and especially a phase-separation press which includes one or more spikes which penetrate into matter which has already been compacted.

FIG. 1 represents the press in elevation with a partial diagrammatic section. A hydraulic jack 1 thrusts a piston 2 along the axis of the tube 11, whilst the moist products, for example, household refuse, are introduced in front of the piston in the compression chamber 3. FIG. 2 shows the same press seen from above, whereas the piston 2 thrust forward by the jack 1 has formed in front of it a compressed cake or slug 4. The water and the fluid organic matter forming sludge are extracted at least through the orifices 5 cut in the movable plate 6 of the head or through orifices 5' (FIG. 3) cut in the cylindrical wall of the chamber. During the compression the cross-channels 7 and/or 7' collecting the sludge communication with the external channels 8 and/or 8' through suitable connections for the fixed orifices 5' and by coincidence of the orifices for the orifices 5 in the movable plate 6. The collector channels 7 then open out at at least one of the sliding sidefaces of the plate so as to come into coincidence with orifices in discharge pipework when the plate is in postion for blocking off the chamber. One may equally well employ flexible pipes. In the case of household refuse the sludge resulting from the compression, which is a nuisance as a fuel, becomes very interesting as a biodegradable material since more than two thirds of it consist of organic matter (or more than twice that in a conventional compost). The sludge taken as it is or dried and pasteurized as the case may be, possibly together with additives, may serve as high-quality manure or feed for animals (pigs, fish and crustaceans, etc.).

As shown in FIG. 3, after the compression of the refuse the plate 6 is removed, for example, by means of the jack 9 (FIG. 1) so as to bring the orifice 10 into prolongation of the compression chamber 3. Finally FIG. 4 shows how the slug 4 is thrust into the heater tube 11 by the piston 2 or a member on this piston, which may be the face 2a of the piston, thrust forward by the rod 2b, forming a telescopic jack and thrusting before it the whole column of slugs 4 injected during the course of the preceding operations. The piston 2, the compression chamber 3, the orifice 10 in the plate 6 and the start of the tube 11 are of substantially the same area.

Different types of press may be suitable so long as they can provide a slug the frontal area of which remains constant. The presses must likewise be capable of compressing the products at a sufficiently high pressure for the extraction of the water and the fluid organic to be possible. Several hundred bars are usually necessary.

The sludge is collected by one or more channels 8 and the slugs are injected by force into a tube 11 of substantially the same area 11a (FIG. 5) as themselves; in this way the slugs which after compression have considerable elasticity, have not been able at any time to expand radially. Thus the succession of them over a certain length (for example, several thicknesses of slug) in the tube 11 is tight against the gases which will be produced downstream. This tube is then advantageously given a diverging taper of a few degrees 11b or of larger area so as to avoid any jamming of the slugs injected by force. By way of example, the diameter may go from 380 to 500 mm. In addition the compression of the said slugs at several hundred bars guarantees their freedom from porosity.

FIG. 5 represents a first embodiment. Next to the diverging portion 11b the tube has another cylindrical portion 11c the length of which is determined with a view to the carrying out of pyrolysis which will now be described. As its outlet end (on the right in FIG. 5) the tube 11 opens into a hearth 15 the lower portion 16 of which may be refractory. The portion 11c of the tube 11 is surrounded by a sleeve 18 the righthand end of which opens into the hearch 16, airtightness being ensured round the connection of the sleeve 18 to the hearth. At the lefthand end the sleeve 18 is closed at 18a round the tube 11, and a tube 19 enables the escape of the gases and smoke in one or more possible directions 20, 21 by means, for example, of a damper 22. A compressor 25 supplies air for combustion to the hearth 16. Another compressor 26 supplies air to the upper portion of the hearth in order to perfect the combustion or to ensure the combustion of part or of the whole of the gases of pyrolysis. A burner 28 may be provided in order to supply fuel for the starting up of the plant. In order to ensure airtightness, in one embodiment the bottom of the hearth dips into a tank 31 full of water. Means 32 are provided for extracting the solid products falling to the bottom of the water.

In accordance with another embodiment of the invention a closed vessel may be employed, forming an airlock, which enables the coke portion to be recovered without wetting it and without producing water gas or steam. In this latter case the tube for the pyrolysis must be heated indirectly from elsewhere.

In accordance with a preferred arrangement the device operates as follows. Slugs 4 thrust forward one after another advance in the tube 11. Airtightness is ensured in the portion 11a at the outlet from the press, as indicated above. The diverging portion 11b avoids blocking and enables the press to make a train of slugs of great length advance without excessive expenditure of power. In the portion 11c the slugs advance with a big enough clearance to present less resistance and to let the gases from pyrolysis pass by. All along the portion 11c the tube is heated to a temperature of the order of 350° to 1200° C. by the gases of combustion from the hearth 16. These gases pass round the tube 11 between the tube and the sleeve 18 so as to heat the tube 11 which for this purpose may have fins 27 of any suitable shape, wavy, spiral, etc.

Under the effect of the heating the volatile constituents are released in the tube 11 and are directed towards the outlet at the right. The slugs are transformed progressively into coke until they tilt into the hearth 16. The length of the portion 11c of the tube must be worked out in order to enable complete pyrolysis: the outside being brought to 800° to 1000° C., the slugs must be distilled and pyrolysed right through. The slugs must remain for a sufficient time, as a function of their diameter. For example, for slugs of 380 mm about one hour is needed, which leads to a length of 25 m for a press which can deliver 4 tons/hour. With a press outlet tube of 250 mm (2 t/h), about 12 m is needed.

The slugs transformed into coke fall into the hearth 16 where they burn with the air sent in by the compressor 25 in suitable amounts. By proportioning the air suitably one can have complete combustion. With residues from household refuse of ordinary type the coke is brought to a temperature of 1600° to 2000°. After combustion in the chamber, sterile molten matter falls into the bottom, such as glass and metal which granulate in the water and are extracted by any suitable means 32.

The water forms a convenient means of cooling and ensuring airtightness but this arrangement is not restrictive of the invention.

The gases from combustion of the coke, with the gases from pyrolysis which are hot, enter the sleeve 18 and maintain the temperature of the tube 11 and leave at 19 after having yielded a portion of their enthalpy.

In permanent operation the combustion of the coke is sufficient in the majority of cases for sufficiently heating up the slugs progressing through the tube 11. If it were necessary for particularly poor products one may in addition burn the gases by injecting air by means of a compressor 26. A burner 28 is provided for starting up the plant (gas or fuel oil). At this stage it is understood that the assembly can operate as an incinerator. It is sufficient that the amount of air injected is sufficient for burning the whole of the combustible solids and gas.

In the general case the gas comprising air mixed with the fumes from the coke is taken off at 19 and may be employed, for example, in a cement factory or for heating a greenhouse. A deflector damper enables the gas to be directed towards one or other employment or towards a flare to burn it if the consumer plant is shut down. Such a device in accordance with the invention will be located in the vicinity of the employment of the calories in order to preserve to the maximum the temperature of the gas leaving at 19 (about 600° C.). With this gas containing air there will be mixed water gas proceeding from the steam which is emitted at the time of the falling of the incandescent slag into the water. The gas may also be taken off at another point, for example, directly out of the tube 11 by pipework located in the zone close to the hottest zone so as to obtain a gas as far as possible free of tar, steam and evil-smelling gases.

At least in the hottest portion of the tube 11 and of the sleeve 18 and for the top of the hearth 15 refractory plates will be employed, which can withstand 1000° C.

A regulation may advantageously be employed, which is a function of the distribution of the temperatures in the space lying between the tube and the sleeve. If the temperature rises too much the admission of air may be reduced, but this leads to unburnt constituents and one may have deposits which may clog the plant. One may also inject water or steam. If on the contrary the temperature drops too much, air is added and a portion of the gases from pyrolysis is burnt.

Figure 6:
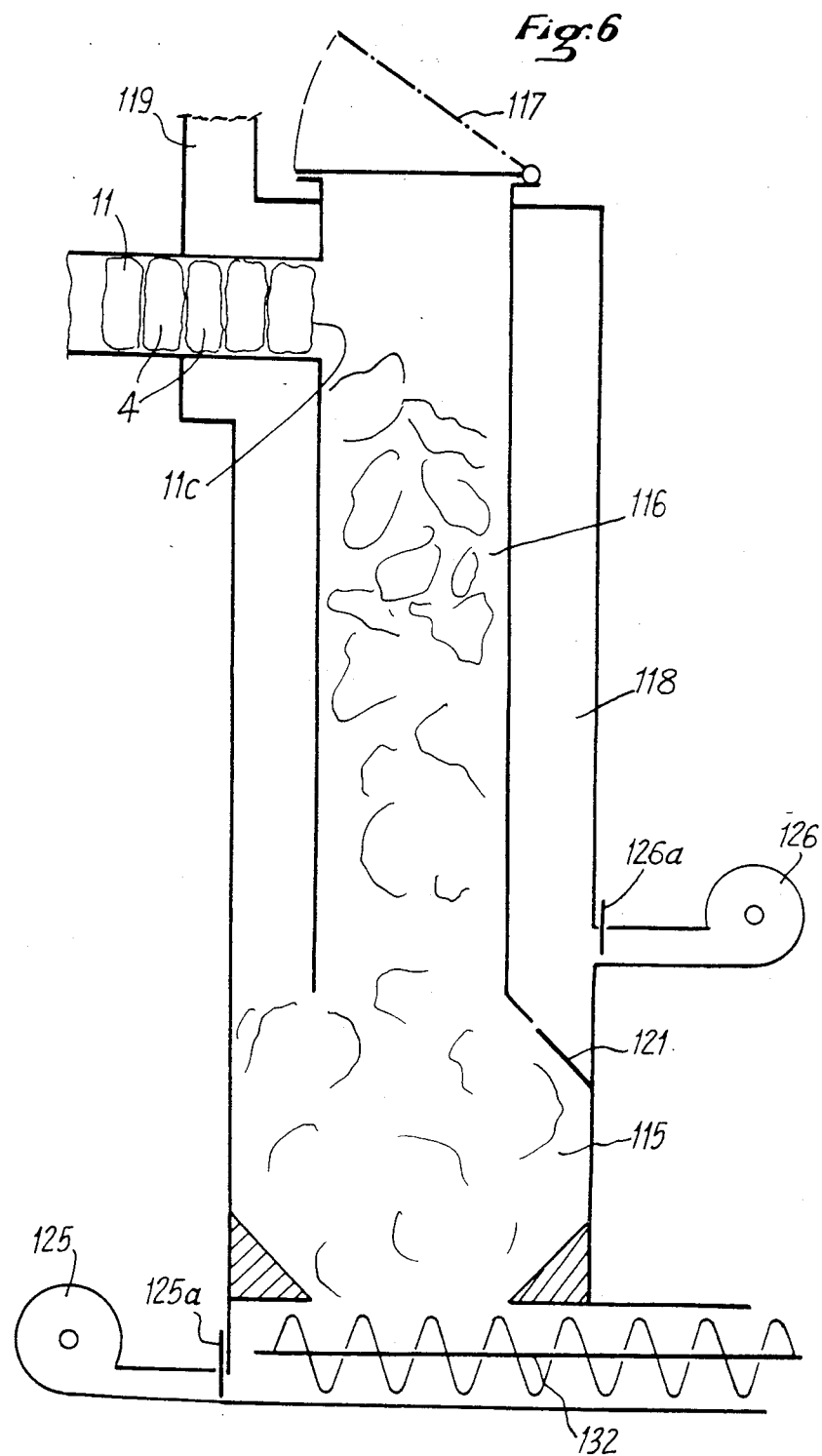
FIG. 6 is a view similar to FIG. 5 of another embodiment.

In the variant embodiment as FIG. 6 the tubular duct joining the press to the hearth makes an angle: only one portion 11 is horizontal and the second vertical portion 116 forms a chimney above the hearth 115. The top end 117 of the chimney may be open or closed depending upon the application or the method of operation. The chimney is surrounded with a sleeve 118 equipped with an outlet stub 119 at the upper part. A discharge system 132 is provided in the bottom portion of the hearth. This may be a screw as shown diagrammatically or a mechanical grate with spikes, a slide with a jack or any similar device which is well known for the discharge of cinder or coke. A fan 125 is arranged below the hearth and a fan 126 is arranged at the bottom of the sleeve 118 above the hearth. In this embodiment one portion of the path of the slugs from the press to the hearth is vertical. In the vertical portion the slugs move under the effect of gravity. This eliminates the risks of blocking. The vertical portion of the tubular duct may have a different width from the horizontal portion.

The device operates as follows. The slugs 4 thrust forward by the piston 2a emerge at the end 11c of the tube 11 and fall into the chimney 116 and drop into the hearth. An accumulation of slugs is formed in the hearth and the chimney, up to a certain height which is a function of the working conditions in running the plant and of the speed of discharge from the system 132.

A number of working conditions are possible:

(1) Inceneration. The damper 117 may be open. Air enters the chimney and passes through the heaped up slugs and reaches the hearth 115 where the combustion occurs. The hot gases which may receive secondary combustion air through the fan 125 and/or the fan 126 rise again in the double wall of the sleeve 118 and heat up the piled up slugs, transforming them into coke. The coke and the gases released burn in the hearth and are released in the tube 119 from which they may be drawn towards a plant capable of recovering the calories remaining after the heating up of the slugs, for example, a boiler. The cinders are discharged by the system 132. It is not necessary to provide a grating 121 between the chimney and the wall of the hearth, the matter in combustion having no tendency to rise up the sleeve. The device is particularly simple and includes no part capable of being distorted. However, a grating is not a nuisance and may have the function of reinforcing the structure. It may be observed that the air passes through the slugs before oxidizing them, the operation being similar to that of a pipe. The damper 117 being open, it is not necessary that the slugs 4 block the tube 11 in an airtight fashion, and such an incinerator can operate independently of the press shown in FIGS. 1 to 4. It might be fed, for example, by a travelling belt which tips the products which are to be incinerated, into the throat of the chimney.

(2) Pyrolysis with recovery of the combustible gases. The damper 117 is closed, as well as the damper 126a of the fan 126 which is shut down. The fan 125 delivers the amount of air necessary and sufficient for the combustion of the degassified slugs, that is to say, of the coke formed in the chimney 116. The gas escapes through the tube 119 towards a suitable combustion plant. The system 132 discharges the cinder.

(3) Pyrolysis with recovery of the coke. The damper 117 is closed as well as the damper 125a of the fan 125 which is shut down. A grating 121 which creates a loss of pressure at the outlet of the gases and an injection of air through the fan 126 are employed. The gases burn in the sleeve, heating up the chimney and the slugs and causing degassing of the latter with the formation of coke. The system 132 then extracts the coke. The discharge must be effected in an airtight manner, as without this air can penetrate and oxidize the coke. It is thus possible to manufacture active carbon with an airlock. Extinction of the incandescent coke is effected with a neutral gas such as nitrogen or carbon dioxide.

In the embodiment as FIG. 6, the degassing of the slugs is effected during a descending vertical path under the effect of gravity in the chimney 116, whilst in FIG. 5 the degassing is effected along a horizontal path, the slugs advancing under the thrust from the press. Depending upon the dimensions of the plant and depending upon the nature of the products, it may be that the friction in the horizontal advance is excessive. In the vertical descent as FIG. 6 this difficulty is eliminated. In addition, the diameter of the chimney may without limitation be greater than that of the tube for the horizontal progress.

As indicated in the lefthand upper portion of FIG. 6, the heater envelope may extend both over the path in the vertical chimney and over the end of the horizontal path round a portion of the tube 11 which may be longer or shorter as the case may be. The arrangements of FIGS. 5 and 6 may thus be combined as a function, for example, of the space available, of the delivery of products to be treated, etc.

In general the tube 11 will be arranged horizontally. It does not depart from the scope of the invention to slope it so as to employ gravity for facilitating the advance of the slugs.

With respect to various known methods, especially for the elimination of refuse, this one offers the advantages of being continuous and of providing a positive balance instead of consuming power.

It goes without saying that the embodiments described are only examples and that it would be possible to modify them, especially by substitution of equivalent techniques, without thereby departing from the scope of the invention.

I claim:

1. A method of treatment of moist waste, with a view to its transformation with recovery of products of value and of energy, including the following operations:

a bundle of waste is compressed in a press under a pressure of at least 200 bars in order to dehydrate it and recover liquids or sludge which may be valuable, the press being capable of being opened and closed;

on leaving the press the bundles of waste are moved forward to a thermal plant, including a hearth, through a tubular channel with the formation of an airtight packing formed by the waste;

the dehydrated waste is heated up on the way to the hearth to a temperature lying between 350° and 1200° C. in order to release combustible gases from it and make coke;

a portion of the products obtained is burned in the hearth and the heat released is employed for the heating of the dehydrated waste; and in this method:

the waste is moved along a horizontal straight path during the course of the first two operations, the press including a piston movable along the horizontal axis of the straight path in the first operation to compress the waste on a first stroke of the piston, a complementary stroke of the piston after opening of the press in the second operation moving forward the slug formed by the bundle of waste which has just been compressed, so pushing towards the hearth the slugs formed in the preceding operation of compression.

2. A method as in claim 1, characterized in that the slugs are heated up during their horizontal progress.

3. A method as in claim 1, characterized in that the slugs fall downwardly into the hearth and are heated up during their descent to the hearth.

4. A method as in claims 1, 2 or 3, characterized in that the gas is burned and the coke is recovered.

5. A method as in claims 1, 2 or 3, characterized in that the coke is burned and the gas is recovered.

6. A method as in claims 1, 2 or 3, characterized in that the gas and the coke are burned and hot gases are recovered.

* * * * *